United States Patent [19]
Schneider et al.

[11] Patent Number: 5,632,583
[45] Date of Patent: May 27, 1997

[54] SPLIT BOLT RING

[76] Inventors: William A. Schneider, 125 Oak Grove La., Conroe, Tex. 77304; Bithel W. Staton, 10 Robin La., Willis, Tex. 77378; Edward B. Cannan, Jr., 205 Thunderbird, Conroe, Tex. 77304

[21] Appl. No.: 503,775

[22] Filed: Jul. 18, 1995

[51] Int. Cl.⁶ ............................................. F16B 27/00
[52] U.S. Cl. ........................................ 411/84; 411/87
[58] Field of Search ..................... 411/84, 966, 444, 411/87, 88, 101; 403/336, 337

[56]           References Cited
           U.S. PATENT DOCUMENTS

|   |   |   |   |
|---|---|---|---|
| 821,297 | 5/1906 | Kohler | 411/966 |
| 856,246 | 7/1907 | Gamon | 411/84 |
| 2,496,770 | 2/1950 | Bennett | 411/966 |
| 2,542,375 | 2/1951 | Torresen | 411/84 |
| 2,620,008 | 12/1952 | Mallard | 411/87 |
| 2,757,025 | 7/1956 | Noyes | 411/966 |
| 3,117,610 | 1/1964 | Matthews | 411/84 |
| 3,456,706 | 7/1969 | Ollis | 411/966 |
| 3,467,417 | 9/1969 | Ollis | 411/966 |
| 5,466,105 | 11/1995 | McKay | 411/84 |

*Primary Examiner*—Steven N. Meyers
*Assistant Examiner*—Gary Estremsky
*Attorney, Agent, or Firm*—John R. Casperson; Chamberlain, Hrdlicka

[57] ABSTRACT

An apparatus formed from a base member and a plurality of bolts is used to position the bolts on a flange. The base member is preferably arcuately shaped and has a first end and a second end. The arcuate base member defines a plane and is hand bendable in the plane. The base member has a longitudinal axis normal to the plane and a radius of curvature with respect to the longitudinal axis. A plurality of bolts are mounted to the arcuate base member. Each bolt of the plurality of bolts extends generally longitudinally from the arcuate base member. The device is useful for mounting items to a flange. A multiplicity of boreholes extend through the flange in a direction generally parallel to the longitudinal axis of the tubular member from the back face to the front face. Each borehole is defined by a borehole wall. The bolts are retained in frictional engagement with the borehole walls due to tension from the arcuate base member.

10 Claims, 3 Drawing Sheets

SPLIT BOLT RING

BACKGROUND OF THE INVENTION

In one aspect, this invention relates to a split bolt ring. In another aspect, this invention relates to a method for positioning bolts in a flange so that other structure can be attached to the flange using the bolts.

Large flanges and high pressure flanges are attached to other devices by a multiplicity of bolts which extend through the flange. Positioning the bolts one at a time for subsequent affixation of a nut and tightening is time consuming. A method of simultaneously positioning a plurality of bolts in a flange would save time.

Upon tightening, it is frequently necessary to put a wrench or other device on the bolt head to keep it from spinning. Sometime, clearance is such that it is difficult or impossible to position a wrench on the bolt head. In such cases, completion of a job can be severely delayed. A device to stop the bolt from turning when the nut is screwed on would be very desirable.

It is known to make split bolt rings from cut plate stock which has been bored to accommodate the bolts. However, cutting the plate and drilling the holes is time consuming. Also, because of the rigidity of the device, small dimensional errors can prevent the bolts from aligning correctly. A bolt holding device which is simple to make and that need not be fabricated to high tolerances would be desirable.

OBJECTS OF THE INVENTION

It is an object of this invention to provide a bolt holding device which is simple and easy to make and that need not be fabricated to high tolerances in order to provide good results.

It is a further object of this invention to provide a bolt holding device which positions several bolts and once and holds the bolts against spinning to facilitate the installation of objects adjacent to a flange.

It is another object of this invention to provide a method for locating bolts in a flange which can be carried out with inexpensive equipment.

SUMMARY OF THE INVENTION

In one embodiment of the invention, there is provided an apparatus formed from a base member and a plurality of bolts. The base member is preferably arcuately shaped and has a first end and a second end. The arcuate base member defines a plane and is hand bendable in the plane. The base member has a longitudinal axis normal to the plane and a radius of curvature with respect to the longitudinal axis. A plurality of bolts are mounted to the arcuate base member. Each bolt of the plurality of bolts extends generally longitudinally from the arcuate base member in a first direction.

The apparatus can be used in conjunction with a tubular member having a longitudinal axis and an end flange. The end flange is positioned in a plane generally normal to the longitudinal axis of the tubular member and has a generally annular front face and a generally annular back face. A multiplicity of boreholes extend through the flange in a direction generally parallel to the longitudinal axis of the tubular member from the back face to the front face. Each borehole is defined by a borehole wall.

The arcuate base member is positioned adjacent to the back face of the end flange so that the plurality of bolts mounted to the arcuate base member extend through the boreholes of the flange and protrude from the front face of the flange.

By providing the base member with hand bendability, it is possible to fabricate the arcuate base member so that the bolt centers have a different radius than borehole centers on the flange. The base member can then be urged into position by hand, and the bolts will be retained in the boreholes by frictional engagement with the borehole wall.

DETAILED DESCRIPTION OF THE PREFERRED EMBODIMENTS

Figure 1:
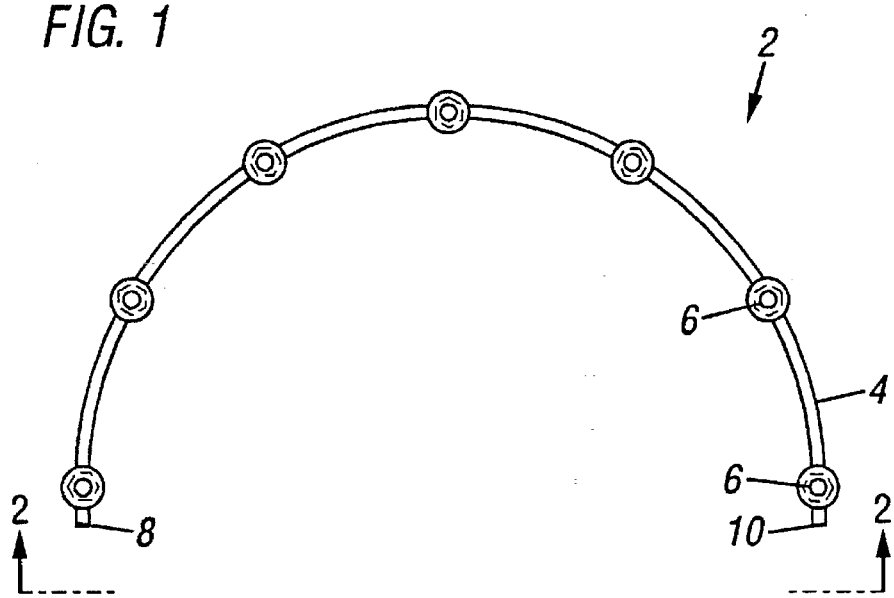
FIG. 1 is a plan view of a first embodiment of the invention.
Figure 2:
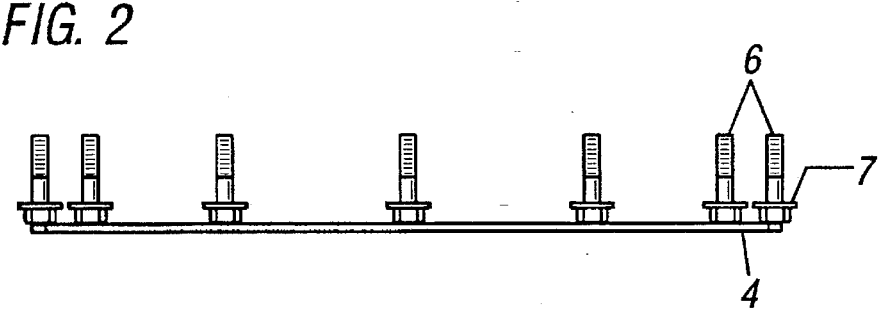
FIG. 2 is a side view of the device of FIG. 1 as viewed along lines 2—2.
Figure 3:
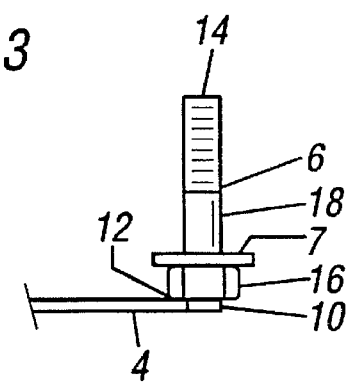
FIG. 3 is a detailed view of a portion of the device shown in FIG. 2.

In the embodiment of the invention shown in FIGS. 1–3, there is provided an apparatus 2 formed from a base member 4 and a plurality of bolts 6. The base member 4 is preferably arcuately shaped and has a first end 8 and a second end 10. As illustrated, the base member 4 is generally C shaped. However, depending on the flexibility of the material from which the base member is made, it could be circular, or oval, or conceivably even straight. The arcuate base member defines a plane and is hand bendable in the plane. The base member has a longitudinal axis normal to the plane and a radius of curvature with respect to the longitudinal axis. The plurality of bolts 6 are mounted to the arcuate base member 4. Each bolt of the plurality of bolts extends generally longitudinally from the arcuate base member in a first direction.

In the embodiment shown by FIGS. 1–3, the arcuate base member has a square cross section in a plane normal to the longitudinal axis. This is best shown by end 10 in FIG. 3. However, other cross sectional configurations, such as circular, could be used as well. The arcuate base member is preferably formed from steel, preferably stainless steel, stock having a thickness as measured in the plane of the arcuate base member in the range of about 1/16 inch to about 1/2 inch, depending on the flexibility of the material and the diameter of the arc. One quarter inch bar stock has been used with good results. Other hand bendable materials, such as wire, or plastic materials, could be used if desired. Using a bendable material avoids the need for making arcuate cuts and makes possible the fabrication of the item from off the shelf bar, rod or flat stock.

The arcuate base member generally spans an arc having an angle in the range of about 60 degrees to about 180 degrees. Preferably, and in the illustrated embodiments, the arcuate base member spans an arc having an angle of about 180 degrees.

Preferably, each bolt 6 has a first end 12 and a second end 14 with a head 16 extending from the first end and a shaft 18 extending from the second end. The first end of each bolt abuts the arcuate base member. See FIG. 3. The bolts can be fixedly mounted to the base member by welding, for example. Optionally, a washer 7 is positioned on the shaft of each bolt adjacent to the head.

Figure 4:
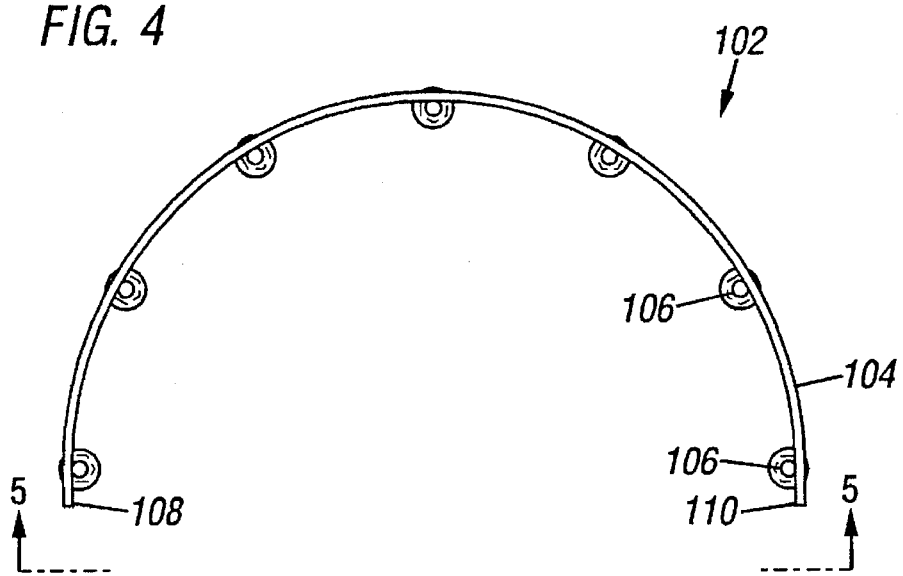
FIG. 4 is a plan view of another embodiment of the invention.
Figure 5:
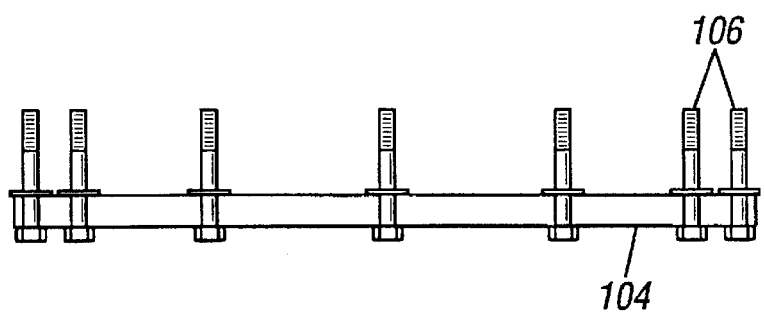
FIG. 5 is a side view of the device of FIG. 4 as viewed along lines 4—4.
Figure 6:
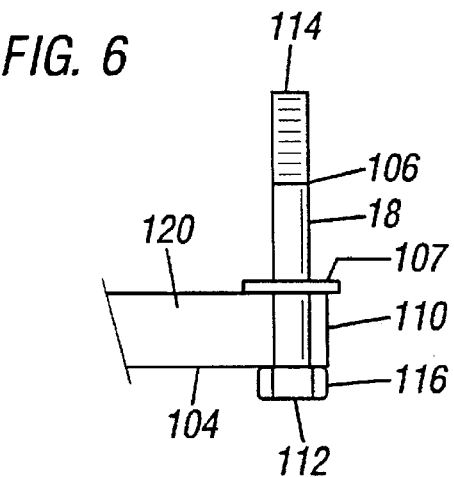
FIG. 6 is a detailed view of a portion of the device shown in FIG. 5.

In the embodiment of the invention shown in FIGS. 4–6, there is provided an apparatus 102 formed from a base member 104 and a plurality of bolts 106. The base member 104 is arcuately shaped and has a first end 108 and a second end 110. The arcuate base member defines a plane and is hand bendable in the plane. The base member has a longitudinal axis normal to the plane and a radius of curvature with respect to the longitudinal axis. The plurality of bolts 106 are mounted to the arcuate base member 104. Each bolt of the plurality of bolts extends generally longitudinally from the arcuate base member in a first direction.

In the embodiment shown by FIGS. 4–6, the arcuate base member has a rectangular cross section in a plane normal to the longitudinal axis. The rectangular cross section has a major axis and a minor axis. The major axis is parallel to the longitudinal axis. This is best shown by end 110 in FIG. 6. The arcuate base member is preferably formed from steel, preferably stainless steel stock having a thickness as measured in the plane of the arcuate base member in the range of about 1/16 inch to about 1/2 inch, depending on the flexibility of the material and the diameter of the arc. One inch by one eighth inch flat or rectangular bar stock has been used with good results.

The arcuate base member generally spans an arc having an angle in the range of about 60 degrees to about 180 degrees. Preferably, and in the illustrated embodiments, the arcuate base member spans an arc having an angle of about 180 degrees.

Preferably, each bolt 106 has a first end 112 and a second end 114 with a head 116 extending from the first end and a shaft 118 extending from the second end. The arcuate base member 104 has a generally cylindrical surface 120. The shaft 118 of each bolt abuts the generally cylindrical surface 120 of the arcuate member 104. See FIG. 6. The bolts can be fixedly mounted to the base member by welding, for example. Optionally, a washer 107 is positioned on the shaft of each bolt 106 which abuts the arcuate base member 104. The head 116 of each bolt 106 preferably also abuts the arcuate base member 104, preferably on an opposite side of the arcuate base member than the washer 107.

Figure 7:
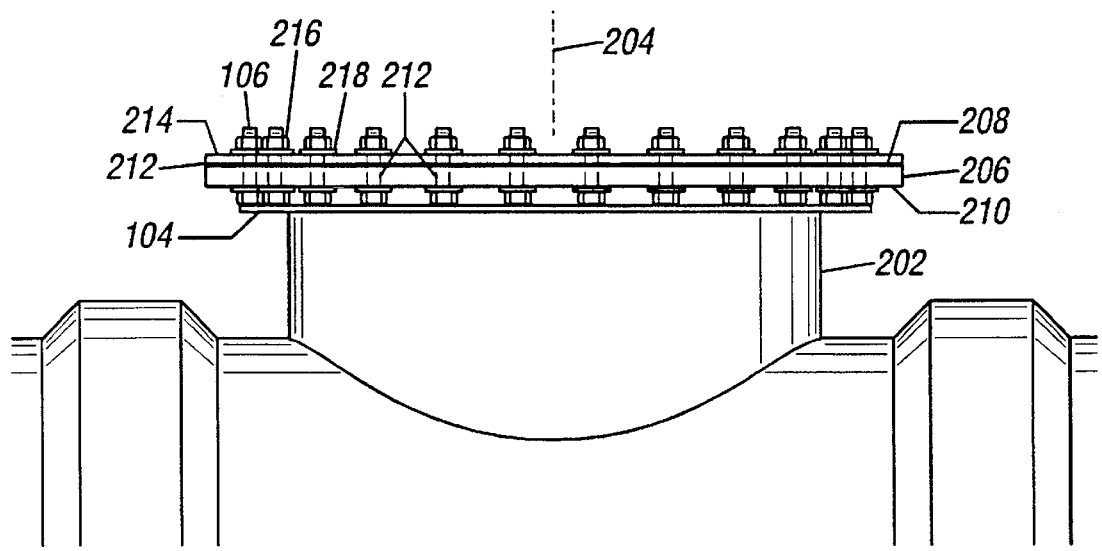
FIG. 7 is a side view of a portion of an apparatus employing the embodiment of the invention shown in FIGS. 1–3.

With reference to FIG. 7, the invention can be used in conjunction with a tubular member 202 having a longitudinal axis 204 and an end flange 206. The end flange 206 is positioned in a plane generally normal to the longitudinal axis of the tubular member 202 and has a generally annular front face 208 and a generally annular back face 210. A multiplicity of boreholes 212 extend through the flange 206 in a direction generally parallel to the longitudinal axis of the tubular member 202 from the back face 210 to the front face 208. Each borehole is defined by a borehole wall. The arcuate base member, arcuate base member 104 as illustrated, is positioned adjacent to the back face 210 of the end flange 206 so that the plurality of bolts 106 mounted to the arcuate base member extend through the boreholes of the flange 206 and protrude from the front face 208 of the flange.

Preferably, the multiplicity of boreholes 212 are positioned in a circular pattern. The arcuate base member 106 is sufficiently non-circular when in a relaxed configuration so that the arcuate base member 106 is retained in position against the back face 210 of the flange 206 by frictional engagement between the bolts 106 and the borehole walls. This can be accomplished by providing different portions of the arcuate base member with different radii of curvature. In a preferred embodiment, the arcuate base member is provided with a first radius of curvature at a mid portion of the arcuate base member and a second radius of curvature which is greater than the first radius of curvature at the first end and the second end. Generally speaking, the second radius of curvature will lie in the range of from about 100.2% to about 120%, of the first radius, preferably in the range of 101% to 110% of the first radius, and even more preferably in the range of 101% to 105% of the first radius. The first radius of curvature of the arcuate base member will generally be in the range of about 6 inches to about 36 inches. For the application shown in FIG. 7, which is a manway for a fiberglass storage tank, the first radius will generally be in the range of about 10 inches to about 18 inches.

Because the borehole pattern on the flange is a circular pattern and the arcuate base member is non-circular when in a relaxed configuration it is necessary to bend the arcuate base member prior to positioning the arcuate base member adjacent to the back face of the end flange. When the arcuate base member is positioned adjacent to the back face of the end flange so that the plurality of bolts mounted to the arcuate base member extend through the boreholes of the flange and protrude from the front face of the flange at least a portion of the plurality of bolts are biased against the borehole walls to provide the frictional engagement between the bolts and the borehole walls to retain the arcuate base member in position.

For the manway application shown in FIG. 7, an annular gasket 212 is positioned on the front face 208 of the end flange 206. A cover plate 214 is positioned on the gasket 212. The cover plate 214 has a plurality of bolt holes and the bolts 106 pass through at least a portion of the plurality of bolt holes. Nuts 216 and preferably washers 218 are positioned on the bolts 106. The nuts 216 are tightened to urge the cover plate 214 against the gasket 212 and seal the tubular member.

While certain preferred embodiments of the invention have been shown and described, the invention is not to be construed as so limited, except to the extent that such limitations are found in the claims.

What is claimed is:

1. Apparatus comprising:

an arcuate base member having a first end and a second end, said arcuate base member defining a plane and being hand-bendable in said plane, said arcuate base member having a longitudinal axis normal to the plane and a radius of curvature with respect to the longitudinal axis said arcuate base member further having a rectangular cross section having a major axis and a minor axis, wherein said major axis is parallel to the longitudinal axis of said arcuate base member, said arcuate base member spans an arc having an angle in the range of about 60 degrees to about 180 degrees, said arcuate base member has a first radius of curvature at a mid portion of the arcuate base member and a second radius of curvature which is greater than the first radius of curvature at the first end and the second end; and a plurality of bolts mounted to the arcuate base member, each bolt of the plurality extending generally longitudinally from the arcuate base member in a first direction.

2. Apparatus as in claim 1 wherein the rectangular cross section of the arcuate base member is a square cross section in a plane normal to the longitudinal axis of the arcuate base member.

3. Apparatus as in claim 2 wherein the arcuate base member has a radius in the range of about 6 inches to about 36 inches.

4. Apparatus as in claim 3 wherein the arcuate base member has a radius in the range of about 10 inches to about 18 inches.

5. Apparatus as in claim 4 wherein the arcuate base member is formed from carbon steel stock having a thickness as measured in the plane of the arcuate base member in the range of about 3/16 inch to about 3/8 inch.

6. Apparatus as in claim 5 wherein the arcuate base member is formed from carbon steel stock having a thickness as measured in the plane of the arcuate base member in the range of about 1/8 inch to about 1/4 inch.

7. Apparatus as in claim 2 wherein each bolt has a first end and a second end with a head extending from the first end and a shaft extending from the second end, wherein the first end of each bolt abuts the arcuate base member.

8. Apparatus as in claim 1 wherein the arcuate base member has a generally cylindrical surface and each bolt has a first end and a second end with a head extending from the first end and a shaft extending from the second end, wherein the shaft of each bolt abuts the generally cylindrical surface of the arcuate member.

9. Apparatus as in claim 1 further comprising a tubular member having a longitudinal axis and an end flange positioned in a plane generally normal to the longitudinal axis, said end flange having a generally annular front face and a generally annular back face and a multiplicity of boreholes extending therethrough in a direction generally parallel to the longitudinal axis of the tubular member from the back face to the front face, each borehole being defined by a borehole wall, wherein the arcuate base member is positioned adjacent to the back face of the end flange so that the plurality of bolts mounted to the arcuate base member extend through the boreholes of the flange and protrude from the front face of the flange.

10. Apparatus as in claim 9 wherein the multiplicity of boreholes are positioned in a circular pattern and the arcuate base member is sufficiently non-circular when in a relaxed configuration so that the arcuate base member is retained in position against the back face of the flange by frictional engagement between the bolts and the borehole walls.

* * * * *